3,215,742
PROCESS FOR THE PREPARATION OF ALKYLENE DIAMINES

Theodore Horlenko and Hopkins W. Tatum, Corpus Christi, Tex., assignors to Celanese Corporation of America, New York, N.Y., a corporation of Delaware
No Drawing. Filed Feb. 2, 1960, Ser. No. 6,119
3 Claims. (Cl. 260—585)

This invention relates to the preparation of aliphatic amines. More particularly, it relates to the preparation of aliphatic diamines, e.g. hexamethylene diamine, from diols, e.g. 1,6-hexanediol, by reacting the diol with ammonia.

It is known that aliphatic monoamines can be prepared by condensing monohydric alcohols with ammonia in the presence of a metallic hydrogenation catalyst. Similarly, aliphatic diamines can be prepared by condensing dihydric alcohols with ammonia in the presence of a hydrogenation catalyst. However, in the treatment of certain diols with ammonia there are produced, in addition to the desired diamine, other reaction products such as imines, secondary and tertiary amines, and high molecular weight polymeric amino compounds. These other reaction products cut down the yield of desired aliphatic diamine.

The production of hexamethylene diamine in good yield by reacting 1,6-hexanediol with ammonia presents considerable difficulties because of the simultaneous formation of hexamethyleneimine,

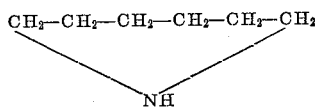

as a by-product of the reaction.

Accordingly, it is an object of our invention to provide a method of producing in good yield an aliphatic diamine from ammonia and a diol.

A further object is to produce and recover such aliphatic diamine without also obtaining appreciable quantities of imines or other undesired reaction products.

Another object of our invention is to provide a method of producing hexamethylene diamine in good yield from 1,6-hexanediol and ammonia.

A further object of our invention is to provide a method of producing hexamethylene diamine from 1,6-hexanediol and ammonia whereby the yield of hexamethylene-imine as a by-product is essentially nil.

Additional objects will become apparent hereinafter.

In accordance with one aspect of our invention, an aliphatic diol having from 2 to 20 carbon atoms (e.g. ethylene glycol or dodecanediol, but preferably 1,6-hexanediol) is reacted with ammonia in the presence of a metallic hydrogenation catalyst, the diol having been first dissolved in a suitable solvent medium, e.g. a solvent which is unreactive and water-miscible, such as dioxane or dioxolane. Although low proportions of solvent, e.g. 5%, may be used, a proportion of the solvent within the range of about 10 to 60%, preferably about 20%, based on the combined weight of diol and solvent, has been found by us to give the best yields of the diamine, when the reaction is carried out at temperatures in the range of about 75 to 250° C.

A particularly suitable hydrogenation catalyst is Raney nickel. Other catalysts are nickel on kieselguhr, Raney copper and Raney cobalt. It is desirable to use super-atmospheric pressures, e.g. pressures above about 100 p.s.i.g., for the reaction. High ratios of ammonia to diol are desirable; for example, best results were obtained when the molar ratio of ammonia to hexanediol was 19:1.

As will be noted from Example I hereinafter, the reaction of 1,6-hexanediol with ammonia utilizing a dioxane solvent concentration of about 20% (based on the combined weight of diol and solvent) results in the production of hexamethylene diamine as the major constituent. The amount of hexamethyleneimine by-product is not quite half that of the diamine.

While the use of a solvent in proper concentration results in an increased yield of diamine, the presence of a certain minimum quantity of imine apears to be inevitable. However, in accordance with another aspect of our invention, the yield of diamine can be markedly increased and the production of imine substantially reduced by recycling the imine by-product back to the reactor. Considering the condensation of ammonia with 1,6-hexanediol to produce hexamethylene diamine and hexamethyleneimine, we have discovered that there is an equilibrium existing between the diamine and imine, as indicated by the following equation:

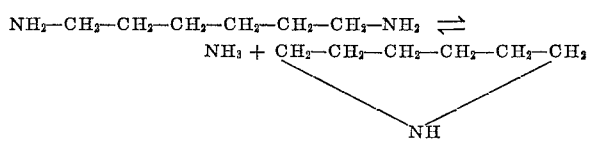

We have also found that when hexamethyleneimine by-product is recycled to the reactor in sufficient quantity, it will reach an equilibrium concentration with the hexamethylene diamine reaction product. At this equilibrium concentration the consumed 1,6-hexanediol is converted chiefly to the hexamethylene diamine, with the amount of imine in and out of the reactor remaining constant.

Considering Examples II and III hereinafter, it will be noted that recycling of the imine results in a vastly increased yield of the desired hexamethylene diamine. Where the amount of imine recycle is about 34%, based on the weight of diol and imine, the yield of imine is nil. It appears that when the hexamethyleneimine concentration in the reactor reaches a concentration of about 34 weight percent, equilibrium is established between the diamine and imine, so that the product recovered is essentially hexamethylene diamine. The amount of imine recycle, based on the combined weight of diol, imine and solvent, may be for example, 10 to 60%, but is preferably at least about 25%.

Although the yield of diamine may be vastly improved by the use of a solvent (as in Example I) and may be further increased by a recycling of the imine by-product (as in Examples II and III), we have found, in accordance with yet another aspect of our invention, that the use of a solvent may be avoided entirely. Thus, an external solvent such as dioxane may be eliminated, provided that the imine by-product, e.g. hexamethyleneimine, is recycled to the reactor. We have found that the imine recycle serves as a solvent medium for the reacting diol and ammonia and at the same time, if recycled in sufficient quantity, suppresses the formation of additional imine and other by-products so that the 1,6-hexanediol is converted essentially to hexamethylene diamine. The amount of hexamethyleneimine in and out of the reactor remains constant. This is demonstrated by Example IV hereinafter, wherein the hexamethyleneimine by-product is recycled at about 30% concentration, in the absence of any solvent, resulting in the obtaining of an optimum yield of hexamethylene diamine. Further, provided that the imine is recycled in sufficient quantity, the yield of the undesired imine as a by-product is kept essentially negligible. Where the only solvent used is the imine recycle, the amount of recycle should be at least about 20%, and preferably about 25 to 35%.

One invention will be further illustrated by the following examples. Unless otherwise indicated, all parts are by weight.

*Example I*

174 parts of 1,6-hexanediol were dissolved in 46 parts of dioxane solvent and the solution was placed in an autoclave with 72 parts of Raney nickel. The autoclave was then chilled to −78° C. in a Dry Ice acetone bath and 500 parts of liquid ammonia were added to the mixture in the autoclave. The autoclave was then sealed and the mixture heated with shaking at 200° C. for six hours; the maximum pressure in the autoclave was 2000 p.s.i.g. during this period. The autoclave was then cooled and the contents were analyzed by mass spectrometer. Conversion of 58% of the diol resulted in a product mixture consisting of 67% hexamethylene diamine and 33% hexamethyleneimine.

*Example II*

54 parts of hexamethyleneimine and 105 parts of 1,6-hexanediol were dissolved in 50 parts of dioxane solvent and the solution was placed in an autoclave with 67 parts of Raney nickel. To this mixture were added 540 parts of ammonia. The autoclave was closed and the mixture heated with shaking at 182° C. and the reaction permitted to continue for six hours. The conversion of diol was 38%. The yield was 100 moles of hexamethylenediamine per 100 moles of diol consumed. No additional hexamethyleneimine was produced.

*Example III*

Example II was repeated; however the reaction was carried out at a temperature of 174° C. Analysis showed 73% conversion of diol. The analysis of the product that showed 91 moles of hexamethylene diamine and 9% unidentified material (presumably higher weight polymeric amines) were produced per 100 moles of diol consumed. No additional hexamethyleneimine was produced.

*Example IV*

54 parts of hexamethyleneimine and 121 parts of 1,6-hexanediol were placed in an autoclave with 72 parts Raney nickel. To this mixture were added 530 parts of ammonia. The autoclave was closed and the mixture heated with shaking at 175° C. for five hours. The autoclave was cooled and the contents analyzed, showing 30% conversion of the diol. The product yield was 100 moles of hexamethylene diamine per 100 moles of diol consumed. No additional hexamethyleneimine was produced.

In each of examples II, III and IV, above, the maximum pressure during reaction was 1700 p.s.i.g.

Understandably, the temperature of reaction affects the degree of conversion of the diol and also the percent yield of diamine. At higher temperatures, such as 200° C., there resulted a higher proportion of unidentified material, perhaps higher molecular weight tertiary and/or polymeric amine. However, that the amount of additional imine detected was in all instances nil.

Generally the suitable reaction temperatures are within the range of 75 to 250° C.

It will be understood that the foregoing detailed description is merely given by way of illustration and that many variations may be made therein without departing from the spirit of our invention.

Having described our invention, what we desire to secure by Letters Patent is:

1. Process for the production of an aliphatic hydrocarbon di-primary amine having from about 2 to 20 carbon atoms which comprises introducing ammonia and an aliphatic hydrocarbon di-primary alcohol having the same molecular configuration as said di-primary amine, in a mole ratio respectively of at least about 19 to 1, and less than 60% by weight, based upon the total weight of said alcohol, of a solvent selected from the group consisting of dioxane and dioxolane into a reaction zone; maintaining said reaction zone at about 70–250° C. at superatmospheric pressure of at least about 100 p.s.i.g.; providing in said reaction zone a catalyst selected from the group consisting of Raney nickel, Raney copper, Raney cobalt and nickel on kieselguhr; reacting the contents of said reaction zone; removing the reaction product to from said reaction zone; recycling substantially all of the heterocyclic imine reaction product having a molecular configuration corresponding to said alcohol to said reaction zone; and recovering said di-primary amine from said reaction product in an amount which is the substantial molar equivalent of the amount of said alcohol reacted in said reaction zone.

2. The process claimed in claim 1 wherein said di-primary alcohol is 1,6-hexanediol, said catalyst is Raney nickel said heterocyclic imine is hexamethyleneimine which is maintained to said reaction zone by recycling an amount thereof equal to about 25 to 60 weight percent based upon the total weight of said 1,6-hexanediol, said hexamethyleneimine and said solvent, said di-primary amine is hexamethylenediamine, and wherein said hexamethylenediamine is recovered from said reaction zone in an amount which is about 91 to 100 moles per 100 moles of said 1,6 hexanediol reacted in said zone.

3. The process claimed in claim 1 carried out in a batch.

References Cited by the Examiner

UNITED STATES PATENTS

| | | | |
|---|---|---|---|
| 2,318,730 | 5/43 | Wilson | 260—585 |
| 2,408,959 | 10/46 | Stegmeyer | 260—683 |
| 2,412,209 | 12/46 | Dickey et al. | 260—585 |
| 2,754,330 | 7/56 | Schreyer | 260—585 |

CHARLES B. PARKER, *Primary Examiner.*

LEON ZITVER, *Examiner.*